United States Patent
Thomas

(10) Patent No.: US 6,916,014 B1
(45) Date of Patent: Jul. 12, 2005

(54) CABLE ROUTING AND AFFIXMENT APPARATUS

(76) Inventor: Jonathan P. Thomas, 63 Ryder St., N. Dartmouth, MA (US) 02747

( * ) Notice: Subject to any disclaimer, the term of this patent is extended or adjusted under 35 U.S.C. 154(b) by 411 days.

(21) Appl. No.: 09/710,374

(22) Filed: Nov. 9, 2000

Related U.S. Application Data

(60) Provisional application No. 60/195,466, filed on Apr. 10, 2000, and provisional application No. 60/165,406, filed on Nov. 13, 1999.

(51) Int. Cl.[7] ............................................. B65H 59/00
(52) U.S. Cl. ............................................. 254/134.3 R
(58) Field of Search ............................... 254/412, 416, 254/389, 134.3 R, 134.3 FT

(56) References Cited

U.S. PATENT DOCUMENTS

| | | | | |
|---|---|---|---|---|
| 2,629,768 A | * | 2/1953 | Beal | 254/134.3 R |
| 3,038,702 A | * | 6/1962 | Trunnell | 254/134.3 FT |
| 3,052,450 A | * | 9/1962 | Trunnell | 254/134.3 FT |
| 3,160,394 A | * | 12/1964 | Hunter et al. | 254/134.3 R |
| 3,201,090 A | * | 8/1965 | Jones | 254/134.3 FT |
| 3,295,832 A | * | 1/1967 | Fowler | 254/389 |
| 4,132,665 A | * | 1/1979 | Nelson | 254/134.3 R |
| 4,260,119 A | * | 4/1981 | Price | 254/389 |
| 4,430,023 A | * | 2/1984 | Hayes et al. | 254/389 |
| 4,796,865 A | * | 1/1989 | Marchetti | 254/134.3 FT |
| 5,183,237 A | * | 2/1993 | Drago | 254/134.4 |
| 5,884,901 A | * | 3/1999 | Schilling | 254/134.3 R |

* cited by examiner

Primary Examiner—Robert C. Watson
(74) Attorney, Agent, or Firm—Charles Bickoff

(57) ABSTRACT

A cable guide for containing and routing cables through building. One version of the guide includes a rigid hollow tube with a slot, flared ends, and mounting hangers while a second embodiment encompasses a tube axially split in two sections. The tube has a bend that traverses any angle necessary for a particular application, typically between 0° and 180°. There may be more than one bend. The cable is inserted and removed from the guide through the straight or helical slot, which extends the full length of the tube or by separating the clamshell. The tube ends are flared. Each end optionally has a cable retaining annular groove for a cable tie or the like. An additional embodiment has a hinged flap to perform the same function. The hangers are tabs that extend from the tube and spaced out along the length of the tube or a bracket like structure which provides a means for attachment.

11 Claims, 9 Drawing Sheets

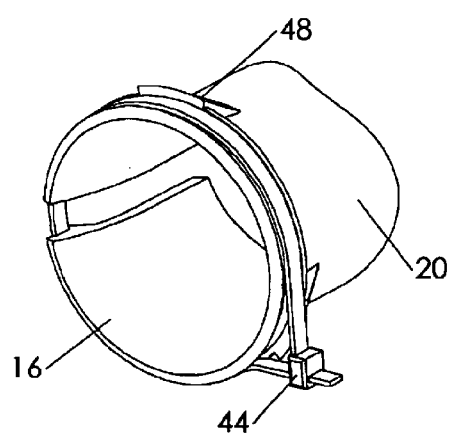
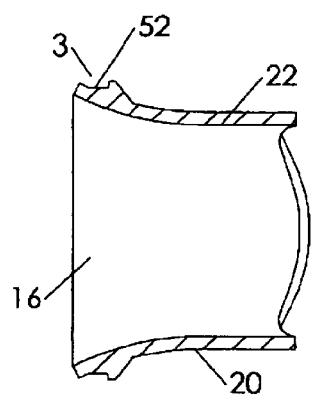
Fig. 12          Fig. 13
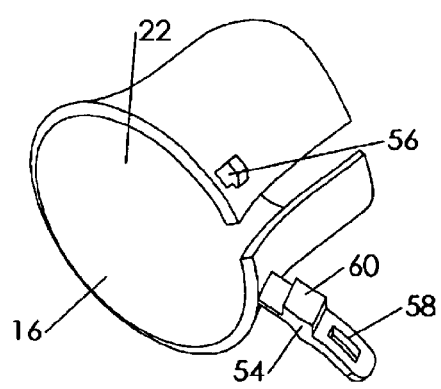
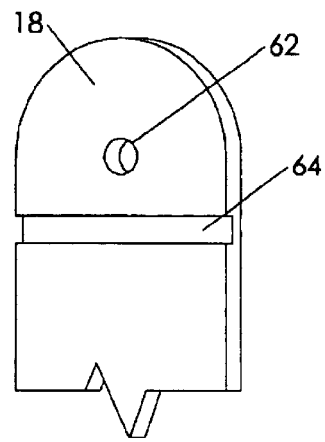
Fig. 14          Fig. 15

CABLE ROUTING AND AFFIXMENT APPARATUS

CROSS REFERENCES TO RELATED APPLICATIONS

This application arises from and claims priority from Provisional Patent Applications 60/165,406 for SPLIT CABLE PULLING ACCESORIES filed on Nov. 13, 1999 and 60/195,466 for CABLE ROUTING GUIDE AND BRACKET filed on Apr. 10, 2000.

STATEMENT REGARDING FEDERALLY SPONSORED RESEARCH OR DEVELOPMENT

Not applicable

MICROFICHE APPENDIX

Not Applicable

BACKGROUND OF THE INVENTION

1. Field of the Invention

The present invention relates to electrical and optical cables, more particularly, to apparatus useful for routing electrical and optical cables as well as flexible tubing through buildings, structures, and the like.

2. The Prior Art

Occasionally a cable or bundles of cables, be they electrical or optical, must be strung through a building, typically along an open ceiling or above a suspended ceiling. Generally, the cable is pulled from one intermediate location to another until the ends of the cable are at their intended locations. The vast majority of the time, there are obstacles, such as corners, support beams, suspended ceiling components, etc. Obstacles mean that the cable cannot be run in a straight line, but must be routed around the obstacle. Making the task more difficult is that, because these obstacles are either not visible, not easily accessible, or obstructed, attention has not been paid to making them safe during initial construction. Typically there are abrasive edges or burrs that can wreak havoc on a cable as it is pulled across the obstacle.

There are currently no satisfactory temporary means for routing cables through obstacles and around corners. U.S. Pat. No. 2,649,746, issued to Taylor, discloses a cable guide composed of two halves that are hingably fastened together at one edge and the other edge is fastened with threaded fasteners to hold it together for snaking cables through and may be taken apart after the cable is in position to allow for easy removal. Feeding large cable bundles through this guide is difficult and may be prohibitive. Additionally, disassembly is time consuming. Besides being mechanically complicated, it cannot be used to guide cables through ceilings, because of both its bulk and the fact that it does not have a means to temporarily mount it to building supports in a manner that is appropriate for ceiling routing.

There are a number of other publications that disclose temporary wire guides, including U.S. Pat. Nos. 2,515,724, 3,038,702, 3,052,450, and 4,951,923. The common thread between these discloses is that they are designed to guide wires into electrical conduits from electrical junction boxes. They all mount to the junction box and do not disclose a means for independent mounting.

Additionally Leviton, Inc. markets a product called "Cable Joe Clamp-on Cable Router". This product is mechanically complicated with a series of rollers circumferentially surrounding the cable path to provide a very narrow point of support. Therefore, it is not suitable for those installations where bend radius is important, such as the routing of optical cables as the Optical fibers could become damaged or non-operational due to an excessively sharp bend. The "Cable Joe" provides a single point of support rather than continuous and therefore may require multiple devices to guide the cable at a single location.

The present invention resolves these limitations by providing a device with a broad continuously supporting structure easily manipulated by the cable-installing individual.

SUMMARY OF THE INVENTION

An object of the present invention is to provide a device for safely routing cables around obstacles and corners during installation.

Another object is to provide a device that can be used for easy insertion of cables, to route cables during installation, and then be easily removed when no longer needed.

Yet another object is to provide a device that can be used to both route cables and act as a permanent bracket.

The cable guide of the present invention provides a means for containing and routing cable through awkward areas, such as bends and around obstacles and areas, which are hazardous to cable integrity. This is especially desirable in a building where it is desired to keep cables at the ceiling rather than allowing loops of cables to hang.

The guide includes a tube with a slot, flared ends, and mounting hangers. The tube is a rigid hollow cylinder with a cross-sectional shape appropriate for the particular application. The inside wall is smooth, and optionally, is surfaced with a friction-reducing coating.

For most applications, the tube will have an arcuate bend that traverses any angle necessary for a particular application, but is preferably in the range of from 0° (a straight tube, no bend) to about 180° ("U"-shaped). The radius of the bend cannot be too small; otherwise it may be too difficult to pull the cables, especially large bundles, through the guide or cause damage to optical cables. The bend may be located anywhere along the length of the tube, as dictated by the application. It is also contemplated that the tube guide may have more than one bend, for example, two bends forming an "S" shape or in multiple planes.

The guide may be straight and relatively short for use typically as a permanent bracket after being used to guide the cables. Optionally, the guide has a set of holes in the tube wall for threading a cable tie to secure the cables to the guide after routing.

The cable is inserted and removed from the guide through the slot. The slot may be straight, serpentine, or helical. The straight slot may be located anywhere on the circumference of the tube and be interchanged with the helical, but is preferably located along the outer part of the bend. Serpentine and helical slots are useful for self-retaining the cables. The helical slot traverses around the tube between the ends. The number of full circuits that the helical slot makes around the tube depends upon the length of the tube, the width of the slot, and the sharpness of the helix. Generally, the number of circuits is limited by the need to maintain the integrity of the guide and to limit the bending of the cable when inserting and removing the cable from the guide.

The tube ends are flared to facilitate pulling cables through to minimize chafing of the insulation. The tube ends are also designed with a cable retainer to temporarily encircle a cable in order to retain the cable while being pulled through. Four retention methods are contemplated:

(1) a cable tie that is tightened around the end within an annular groove;
(2) a hinged flap, secured closed by a latch;
(3) a circular sector, c-clip, greater than 180° that may be rotated over the open slot for retention and away from the open slot for cable removal; and
(4) a hook and loop fastener strap either loose or permanently attached to the guide.

The hanger is a tab that extends from the tube, typically, tangentially from the outer surface of the tube parallel to the plane of curvature of the tube. Alternative arrangements are-also contemplated by the present invention, including, for example, a hanger that extends perpendicular to the plane of curvature and a hanger that extends radially from the tube surface. The hangers are spaced out along the length of the tube. The hangers mount the guide temporarily or permanently. It will be recognized by those skilled in the art that various beam clamps may be useful in fastening the present device to structures.

Other objects of the present invention will become apparent to those skilled in the art in light of the following drawings and detailed description of the invention.

BRIEF DESCRIPTION OF THE DRAWINGS

For a fuller understanding of the nature and object of the present invention, reference is made to the accompanying drawings, wherein:

FIG. 12 is a perspective view of the use of a cable tie to encircle the tube end;

FIG. 13 is a cross-sectional view of the tube end of FIG. 12;

FIG. 14 is a perspective view of the use a hinged flap fill the slot at the tube end, shown in the open position; and FIG. 15 is a perspective view of an optional configuration of the hanger.

DETAILED DESCRIPTION OF ILLUSTRATED EMBODIMENTS AND THE BEST MODE

Figure 1:
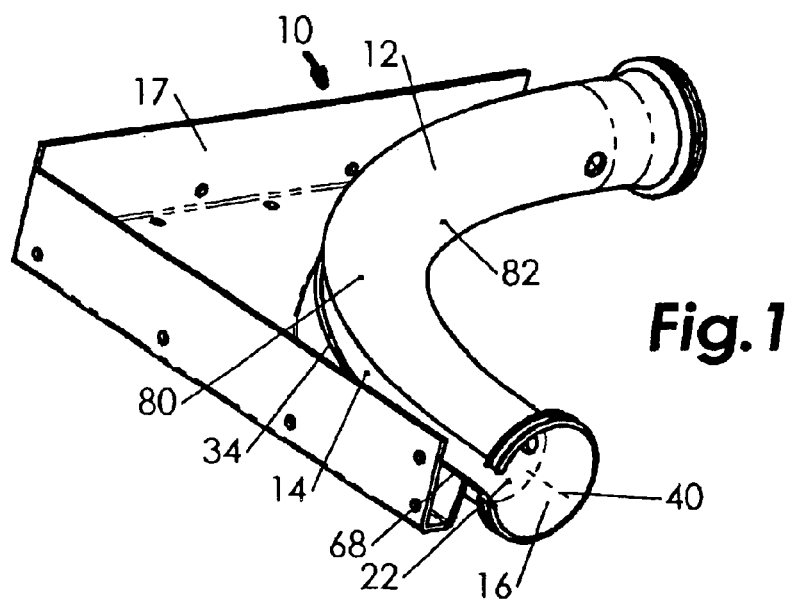
FIG. 1 is a perspective view of one embodiment of the cable routing guide and bracket of the present invention showing the linear open loading slot at the outer circumference.
Figure 2:
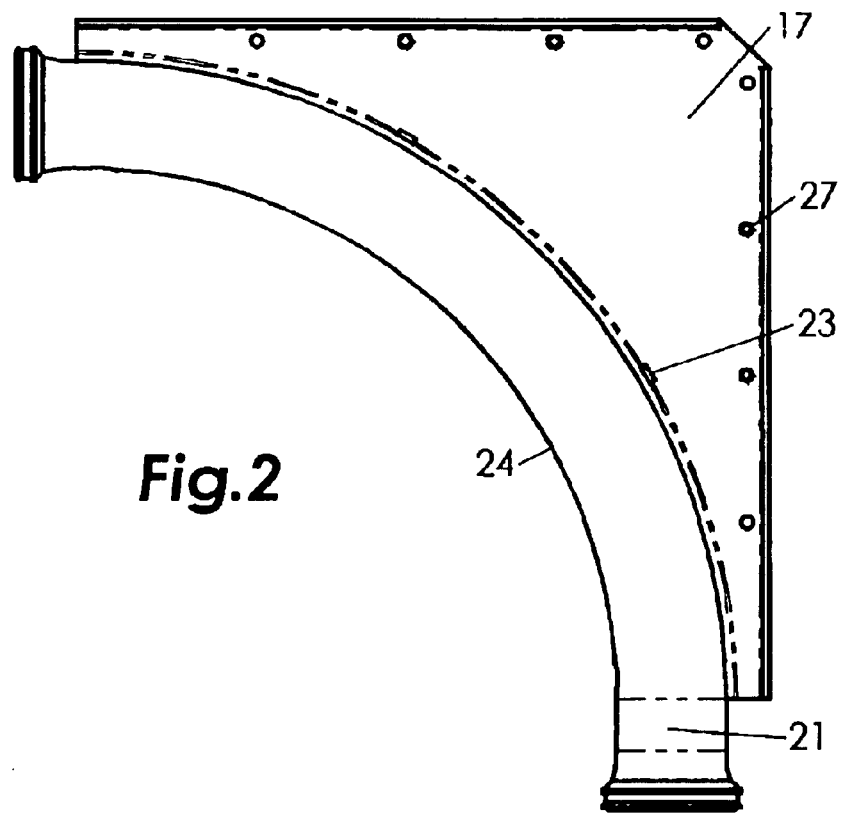
FIG. 2 is a top view of the guide of FIG. 1 showing an example of mounting holes and cable tie slots and grooves.

The cable routing guide and bracket (the "guide") of the present invention is shown in the figures. FIGS. 1 and 2 represent one variant of the preferred embodiment wherein the guide 10 comprises a tube 12 with a slot 14, flared ends 16, an optional straight section 21 and a mounting hanger 17.

The tube 12 is a hollow cylinder composed preferably of a rigid plastic including materials having a friction reducing quality. It may also be composed of cast or stamped metals or alloys, such as aluminum or steel. It also may be comprised of single or multiple pieces that are manufactured separately and then permanently or temporarily fastened together. The cross-sectional shape of the tube 12 may be round, oval, or any other shape appropriate for the particular application. The inside wall 22 is smooth so that cables can be slid easily through the guide 10 without being snagged or otherwise obstructed by the guide itself. Optionally, the inner surface is coated with a friction-reducing coating or inlayed strips of a friction reducing material to facilitate pulling cables there through. There is no preferred inside diameter for the tube 12 as it varies with the particular application for which the guide 10 is designed. However, the smallest practical diameter is approximately 0.5 inch, and the diameter can range upwardly from there. It is also contemplated that the diameter may vary over the length of the tube 12. For example, the tube 12 may be narrower at one end than at the other.

For most applications, the tube 12 will have a bend 24 as shown in FIG. 2. The bend 24 can traverse any angle necessary for the particular application, but is preferably in the range of from 0° (a straight tube, no bend) to about 180° (U-shaped). One parameter of the bend 24 is the bend radius. If the bend radius is too small or too sharp, it may be very difficult to pull the cables through the guide. Also, the bend radius is important for optical cables, which typically have a minimum bend radius, below which the optical fibers will not operate properly or in the most extreme case suffer failure-inducing fractures. Thus, the present invention contemplates that the bend radius will be appropriate for the particular situation.

Figure 9:
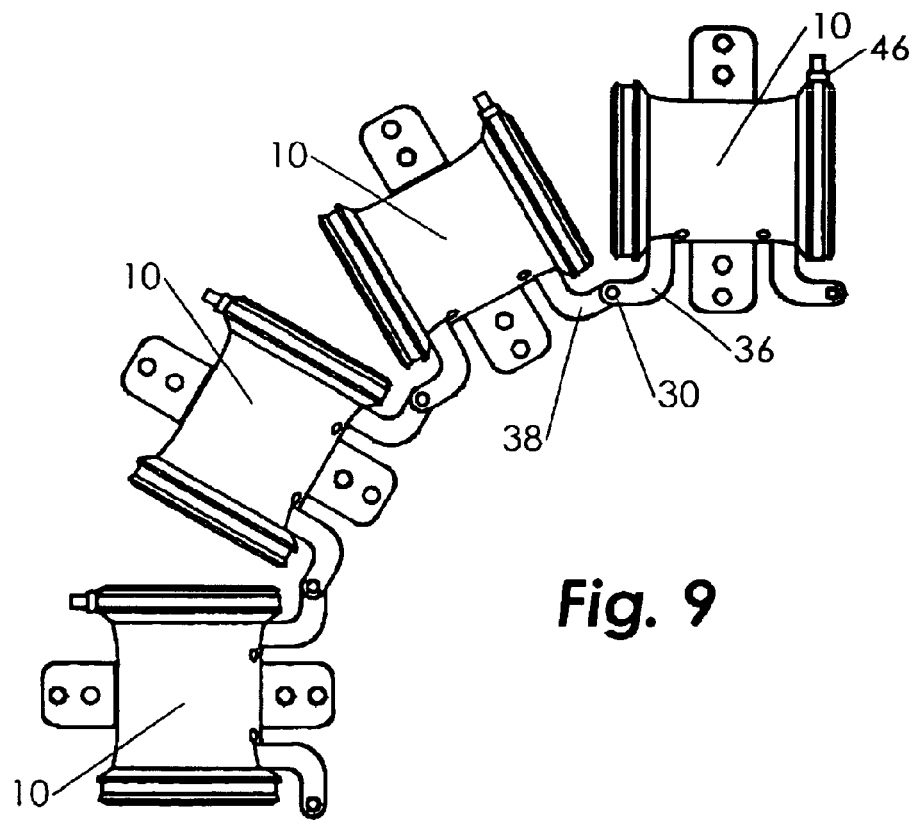
FIG. 9 is a top view showing a plurality of the guides of FIG. 8 hingeably attached in a flexible manner.
Figure 10:
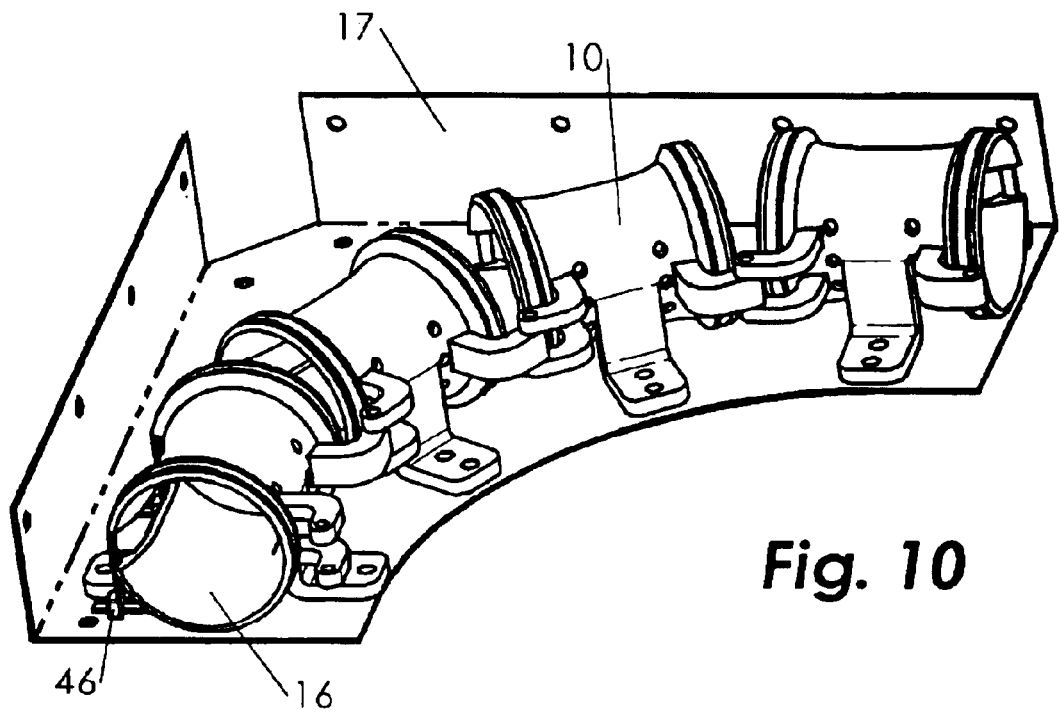
FIG. 10 is a top view showing a plurality of the guides of FIG. 8 attached to a bracket to form a variant of the guide of FIG. 11 is a perspective view of the guide of FIG. 8 using a cable tie to secure cables.

It is expected that guides 10 will be manufactured with several fixed bend angles, such as 0°, 45°, 60°, 90°, 120°, 135°, and 180°. It is obvious to anyone skilled in the art that other fixed angles are possible and may be desirable. The present invention also contemplates that the tube 12 may have articulating sections as shown in FIG. 9 or be composed of a stretchable or flexible material so that it can be formed as needed for the particular task at hand.

The bend 24 may be located anywhere along the length of the tube 12. For example, the bend 24 of FIGS. 1 and 2 is at the center of the tube 12. Other applications may require that the bend 24 be located closer to one of the ends 16 so that a straight section 21 be located between the bend 24 and the end 16.

The guide 10 may be attached to structures using a variety of means including the corner bracket 17 of FIGS. 1, 2, 3, 4, and 10 or the legs of FIGS. 5, 6, 8, and 9. It will be recognized by those skilled in the art that other attachment means are equally viable and do not depart from the essence of the present invention. FIG. 2 also shows a slot 23 useful for passing a cable tie there through to encircle the guide 10 to retain the cables within the guide 10. Multiple slots 23 may be located along the edge of the tube 12 for this purpose.

Figure 3:
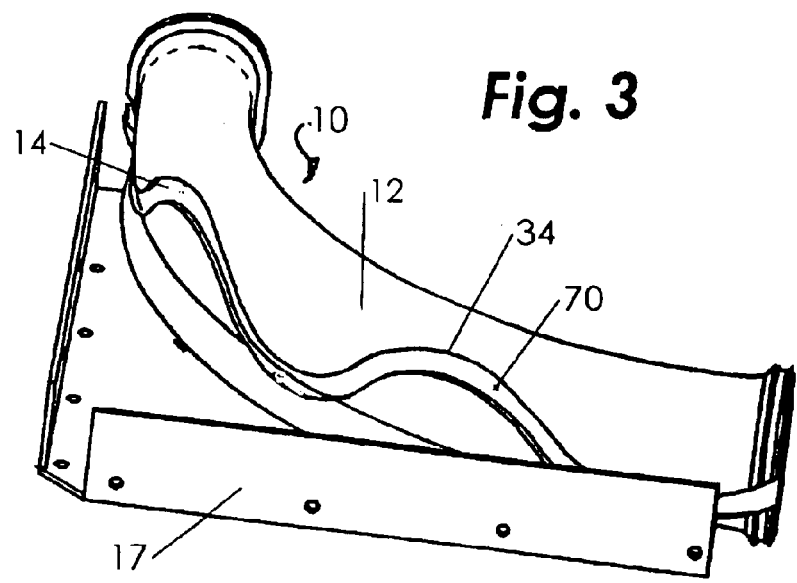
FIG. 3 is a perspective view of a variant of the cable routing guide and bracket of the present invention wherein the circumferential slot is irregular in shape.
Figure 4:
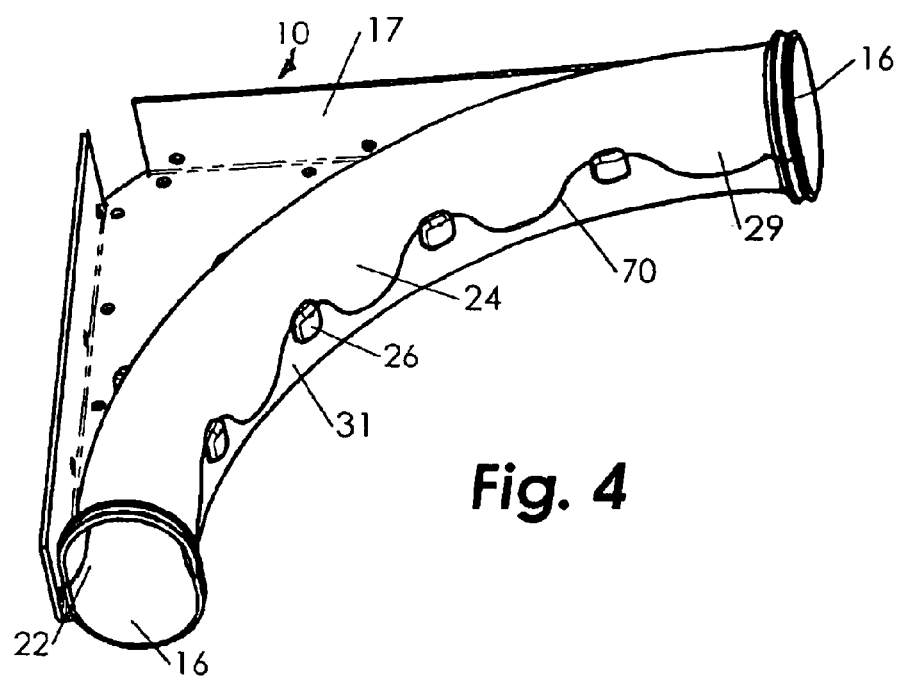
FIG. 4 is a perspective view of a variant of the cable routing guide and bracket of the present invention wherein the circumferential divider between the upper and lower separable halves is irregular in shape and the cross-section elongated.
Figure 7:
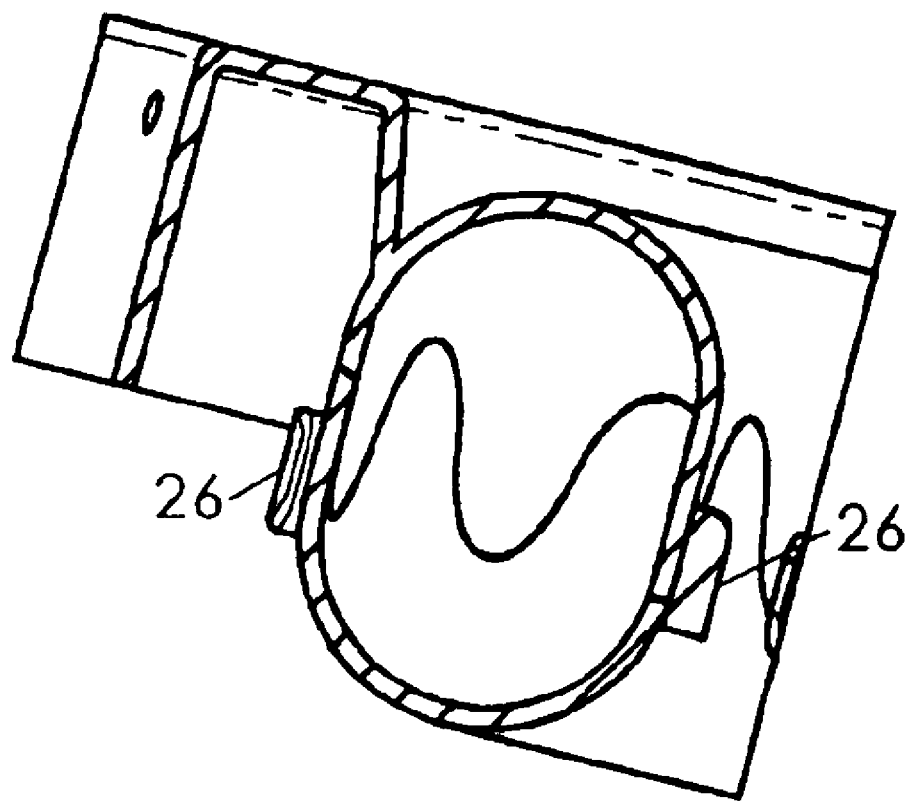
FIG. 7 is a cross-sectional view of the guide of FIG. 4 showing the locating tabs.

FIG. 3 shows the guide 10 of FIGS. 1 and 2 wherein the cable-receiving slot is serpentine. A slot of this nature acts to retain the cable within the guide 10. FIG. 4 shows a guide 10 having a circular cross-section 22 with elongated and flattened sides and flared ends 16. The slot 70 in the case of the guide 10 of FIG. 4 is zero width and serpentine in nature and passes through the tube 12 at both the inner and outer radius of said bend 24. This results in the creation of an upper portion 29 and a lower portion 31. In the alternative, the serpentine slot may pass through the upper and lower surface. Said serpentine slot 70 serves to present an overlapping surface to the cable and eliminates a crevice which might ensnare the cable being drawn through it. The cross-section in this case is an oval like shape with flat sides in the area of the serpentine to facilitate fabrication of said guide 10. Additionally, the upper portion 29 and the lower portion 31 are maintained in relative position by tabs 26 as shown in FIG. 7. These tabs 26 may be locating in nature or locating with a snap retention feature which maintains the integrity of the upper portion 29 with the lower portion 31 until fastened together with a cable tie or like device. Said cable tie retention of the upper portion 29 to the lower portion 31 is shown on FIG. 4.

FIGS. 1, 2, 3, 4, 5, 6 and 8 are variants of the same preferred embodiment of the present invention. FIG. 3 might be fabricated having the zero width slot of FIG. 4 on the inner radius of bend to eliminate forming a cable-ensnaring crevice.

Figure 5:
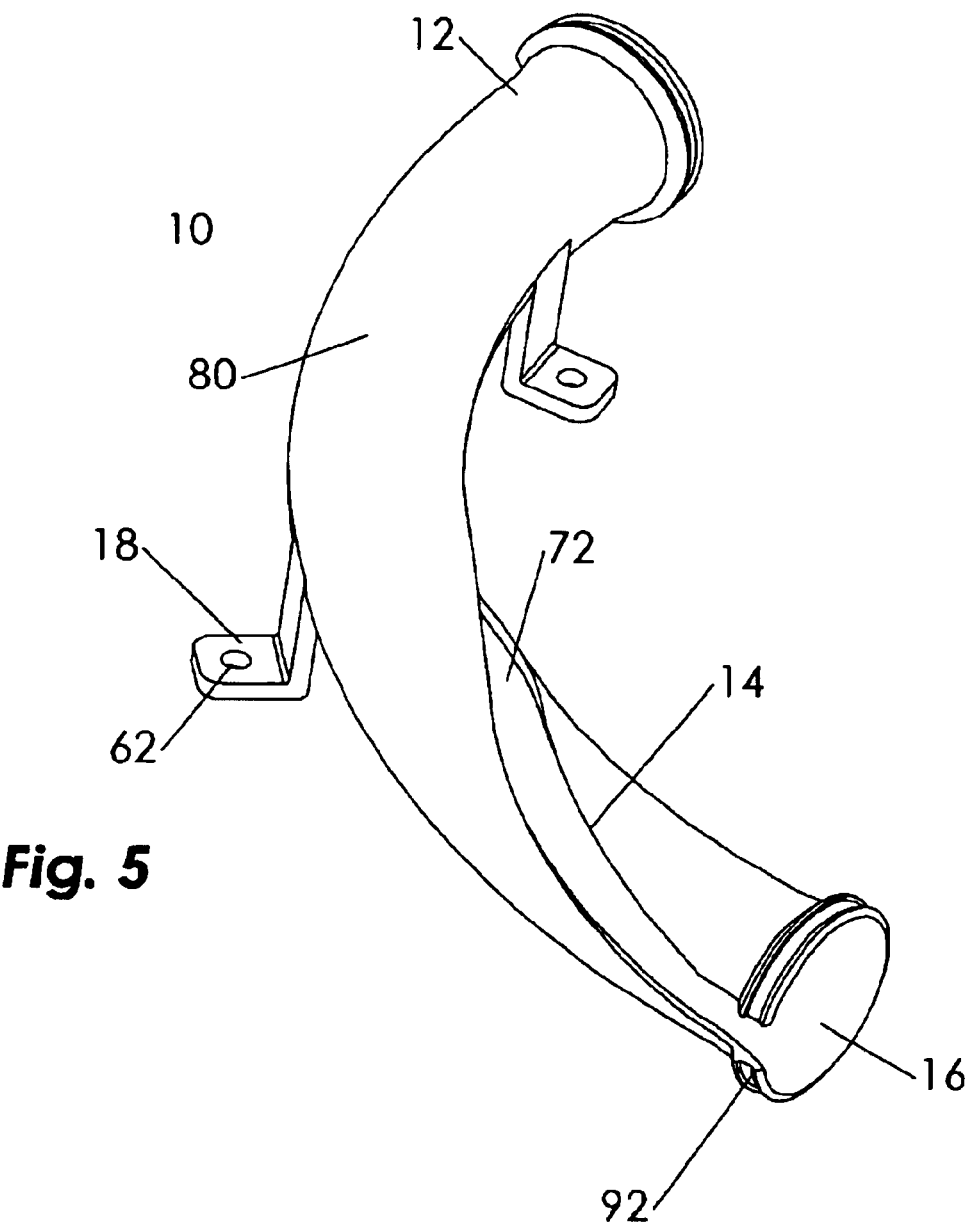
FIG. 5 is a perspective view of another embodiment of the cable routing guide and bracket of the present invention wherein said slot is unidirectional serpentine.

FIG. 5 shows the guide 10 with a slot 14 having a unidirectional helical configuration shown as slot 72. While the start of said helical slot can be located anywhere on the circumference of the edge 92 of the flared inlet portion 16, it is preferable to locate said start on the outer portion 80. Shown by way of reference are three mounting feet 18 with mounting holes 62. The mounting feet 18 may be appropriate in number to the length and size of the guide 10.

Figure 6:
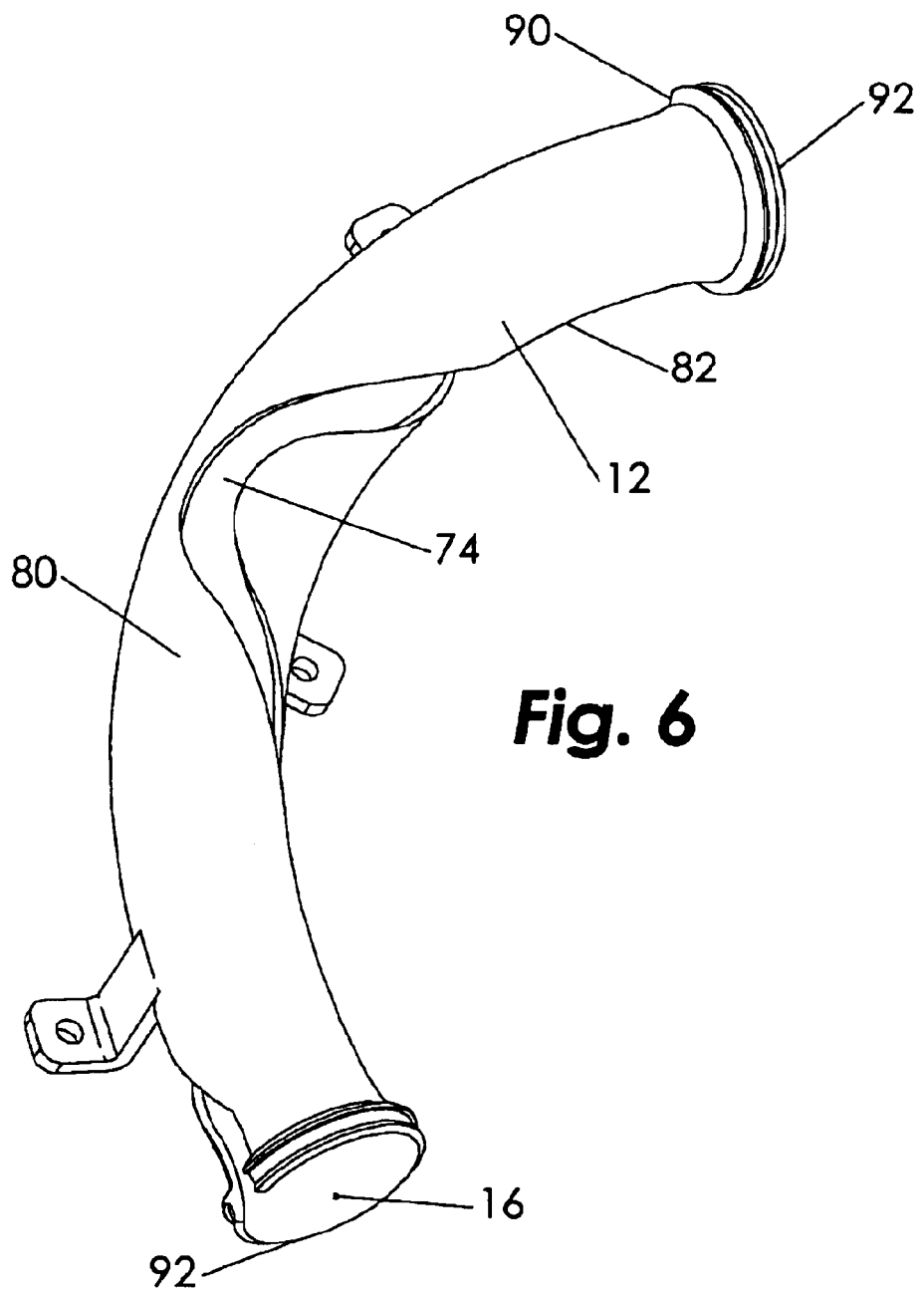
FIG. 6 is a perspective view of another embodiment of the cable routing guide and bracket of the present invention wherein said slot is a reversing serpentine.
Figure 8:
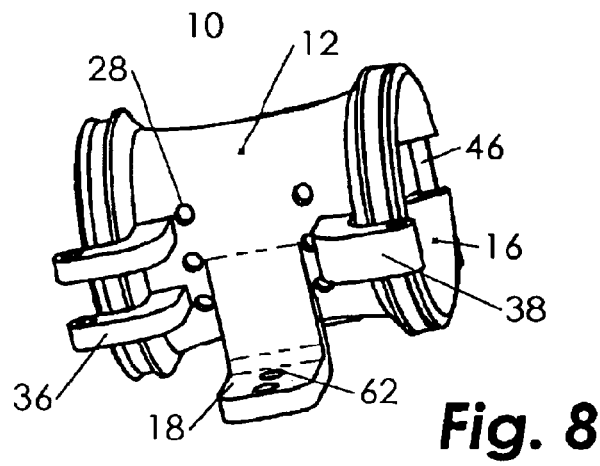
FIG. 8 is a perspective view of a short, straight guide of the present invention.
Figure 11:
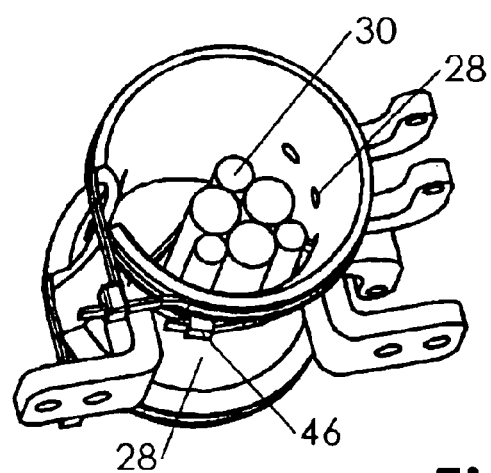
Figure 16:
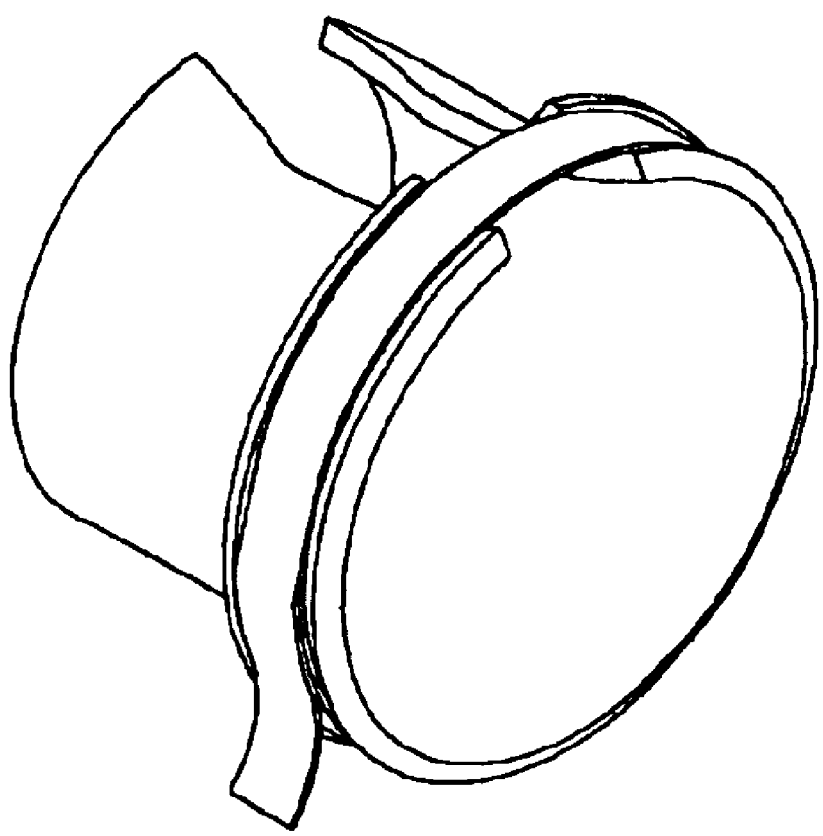
FIG. 16 is a perspective view of the use of a hook and loop strap to encircle the tube end within the annular groove with the loop facing inward and the hook facing outward.

FIG. 6 is similar to the guide of FIG. 5 with the exception that the slot 14 of FIG. 5 has a reversing helical configuration 74. As shown in FIG. 8, the present invention contemplates that the guide 10 may be straight and relatively short. This type of guide 10 is more likely be used as a permanent bracket after being used to guide the cables. Optionally, the guide 10 has a set of holes 28 in the tube wall for threading a cable tie 46. FIG. 8, additionally shows by way of example a means for forming a hingeable or flexible guide wherein the short sections of FIG. 8 a connected together as in FIG. 9 with pins 30 connecting clevis 36 and wrist 38. The mating surfaces of said clevis 36 and wrist 38 may additionally have indexing serrations to facilitate positioning the guides relative to one another in a fixed relationship wherein the pin 30 is replaced by a nut and bolt or the like for fastening the sections in position. This structure may be repeated a plurality of times to create a guide of desired length. The guide 10 also may have holes 28 for use with cable ties 46 to affix cables 31 to said guide 10 as shown in FIG. 11. The guide 10 of FIG. 8 may also have feet 18 with holes 62 for structural attachment. It will be recognized by those skilled in the art that other attachment and hinging arrangements are possible without departing from the essence of the present invention.

The slot 14 is the means by which the cable is inserted and removed from the guide 10. It extends the entire length of the tube 12. There are four preferred embodiments of the slot 14, the straight slot 68 of FIG. 1, the serpentine slot 70 of FIGS. 3 and 4, the unidirectional helical slot 72 of FIG. 5, and the reversing helical slot 74 of FIG. 6. In FIG. 1, the straight slot 68 is preferably located along the outer part 72 of the bend 24. It is preferred that the straight slot 68 be located in the outer part 80 as the cables are naturally drawn against the inner surface 22 at the inner part 82 of the bend 24, as they are pulled through the guide 10.

In some instances, the straight slot 68 will traverse the inner part 70 of the bend 24. For example, with an S-shaped tube, a straight slot 68 will necessarily traverse outer part 72 of one bend 24 and the inner part 70 of the other bend 24. In this case a transitional helical slot will connect the slots between the inner and outer bends.

The helical slot 74 traverses around and along the tube 12 between the ends 16. The helical slot 74 makes it extremely difficult for the cables to come out of the slot 74 unless manually removed. This assures that the cables will remain in the slot 74 while being pulled through the guide 10. If the cables are allowed to come out of the guide 10 and the helical slot 74, they may snag on obstacles thereby defeating the purpose for using the guide 10. The number of full circuits that the helical slot 74 makes around the tube 12, depends upon the length of the tube 12, the width of the helical slot 74, and the sharpness of the helix. A longer tube can handle a slot that makes more circuits of the tube. A narrower slot can make more circuits than a wider slot for the same length tube. Generally, the limits upon the number of circuits the helical slot 74 can make are set by the need to maintain the integrity of the guide 10 and ease of insertion and removal of the cable. For example, in the guide 10 of FIG. 5, the slot makes approximately two full circuits. In some cases, it may be desirable for the guide 10 to have a combination of both a left and right hand helix as shown in FIG. 6. FIG. 6, shows a guide 10 wherein the helical slot 74 is reversing and is shown to make one circuit in each of the clockwise and counterclockwise directions. This configuration preferably has a first helical slotted portion 90 starting at the first entrance edge 92 on the outer bend portion 80 with a finish at the center of the outer bend portion 80. A second helical slotted portion start 94 progresses from the second entrance 96 on the outer bend portion 80 of said guide 10 with a finish at the center of the outer bend portion 80 preferably tangent to the finish of said first helical slotted portion 90. In this configuration it is desirable for each of the right and left-hand helixes to make approximately one circuit of the guide. The sharpness of the spiral, the length of the tube 12 required for one circuit, and the pitch of the helix may vary over the length of the tube. For example, the helix may have a smaller pitch at the ends of the slot 14 than in the middle.

The width of the slot 14 depends upon the diameter of the tube 12 and the use to which the guide 10 will be put. It must be at least as wide as the largest cable to be routed, and preferably wider so that the cable may be removed easily. The slot 14 cannot be too wide; otherwise it may compromise the integrity of the tube 12. The width of the slot 14 also may vary, for example, being wider at the ends than in the middle.

The lips 34 along the slot 14 are preferably smooth so that there is no abrupt change in the lip surface to create a sharp edge that can abrade or otherwise damage the cable as it is pulled through the guide 10. There is no preferred shape for the lip 34, although round or oval cross-sections are generally the easiest to manufacture.

The tube ends 16 are flared to facilitate pulling cables that are not coincident with the axis of said guide 10 through the guide 10. The amount of flare of the tube ends 16 determines that range of angles from the flared end axis 40 over which cables may run. To further facilitate pulling the cables, the lips 92 of the flared ends 16 are smooth so that there are no abrupt changes in the surface that can cause wear or damage to the cable as it is pulled through the guide 10.

In FIGS. 12 and 13 the tube ends 16 are designed with a feature 48 to locate a cable tie, slot closing clip, hook and loop strap or slot closing latch 54 as shown in FIG. 14 to temporarily encircle a cable already within the guide 10. This is necessary to retain the cable within the guide 10 while being pulled there through. In one cable retention method contemplated by the present invention, a cable tie 44 is tightened around the end 16, as in FIG. 12. In order to prevent the cable tie 44 from sliding toward the center of the guide 10, an annular groove 50 is formed in the outer surface 20 of the tube 12. The function of said groove segments formed by projections 48 radiating out from the outer surface 20 might alternatively simulate annular groove 50. As shown in FIG. 13, the groove 50 is preferably deep within the tube wall so that the floor 52 of the annular groove 50 is as close to the inner surface 22 of the tube 12 as practical while retaining the integrity of the guide 10. The purpose is to have the cable tie 46 as close to the inner surface 22 as practical to reduce the edges created between the cable tie 44 and the lips 34 of the slot 14. To accomplish this, as an example, the diameter of the annular groove may be eccentric from the diameter of the tube thereby creating a thinner section at the slot than elsewhere. The advantage of the cable tie 44 is its simplicity and the fact that cable ties are so universally available that it is highly likely that the people using the guide 10 of the present invention already employ them in other aspects of their work.

In the alternative, hook and loop straps, c-clips, and other equivalent means may be used to perform the same function as the cable tie 44.

A further cable retainer 54 embodiment, shown in FIG. 14, is a hinged flap 54 secured closed by a latch 56. The main advantage of the hinged flap 54 is that the inner surface 58 of the flap 54 may be shaped, as at 60, to fill the space left by the slot 14 so that the inner surface 22 at the ends 16 present a smooth, uniform surface. This reduces the chances that a thin cable may be caught in the corner created by a cable tie against the slot rim.

The hangers 18 are used to mount the guide 10 for use. In another version of the preferred embodiment, a hanger 18 is a tab that extends from the tube 12. In the embodiment of FIG. 5, the hanger 18 extends tangentially from the outer surface 20 of the tube 12 with mounting surfaces parallel to the plane of curvature of the tube 12.

Alternative arrangements are also contemplated by the present invention, including, for example, a hanger that extends perpendicular to the plane of curvature and a hanger that extends radially from the tube surface. The present invention also contemplates that combinations of different hangers may be used on a guide 10.

The hangers 18 are spaced out along the length of the tube 12. The number of hangers 18 depends on several factors, including the length and diameter of the guide 10 and the amount of bend in the tube 12. A guide that is about 12 inches long with a 90° bend, as in FIGS. 5 and 6, will typically have three hangers 18, one near each end 16 and one on the bend 24. A short, straight guide, like that of FIG. 8, only has space for one hanger 18. In general, more hangers 18 are needed for longer tubes 12, with more turns, and of greater diameter. The reason for the later is that tubes 12 of greater diameter can carry more and/or larger cables, which are typically heavier. Again, this rule is a generalization and the number of hangers 18 may vary with the particular application. In addition, the direction at which the hangers 18 extending from the tube 12 will typically alternate in order to provide more balanced support.

The hangers 18 may be used to mount the guide 10 either temporarily; as when the guide 10 is being used only as a temporary guide, or permanently, as when the, guide 10 is being used as a permanent bracket. Preferably, the hanger 18 includes at least one mounting hole 62. Typically the hole 62 will be used for a nail or screw, but may also be sized for a rivet, cable-tie, or for other mounting hardware. Optionally, the hangers 18 are arranged so that the holes 62 form a regular pattern, for example, a 90° angle. This may prove advantageous when using a 90° guide since building supports tend to be at 90° angles to each other. Optionally, as in FIG. 15, the hanger 18 may include notches and/or a groove 64 into which a tie-wrap may fit when use of the hole 62 is not appropriate the particular application.

OPERATION

When using the guide 10, the cables are first inserted into the guide 10 by feeding the cables in to the straight slot 68 or twisting the cables around the guide 10 into the helical slots 72 or 74. This must be done first, particularly if the helical slot 72 makes at least one full circuit of the tube 12, since part of the slot 72 will most likely be blocked by the building supports to which the guide 10 is mounted. The cable retainer 44 (the cable tie 46 or the flap 54) is then engaged, and the guide 10 is mounted to the building supports with whatever means is appropriate. For example, if the supports are wood, screws may be used. If the supports are of a harder material, such as steel girders, cable ties or beam clamps may be used. After the cable is pulled through the guide and is in position, the guide can be removed. First the attachments mounting the guide to the building supports are removed and the cable retainer 44 is disengaged. Then the cables are removed from the guide 10 by moving the cables from the straight slot 68 or twisting the guide 10 around the cables to remove them from spiral slot 72. As indicated above, it may be desired to permanently mount the guide 10 as a bracket, in which case the guide 10 is not removed.

Thus it has been shown and described a cable routing guide and bracket which satisfies the objects set forth above.

What is claimed is:

1. In a cable routing and affixment apparatus useful for installing, guiding, damage preventing, and retaining cable-like elements, the improvement comprising:

a cable routing and affixment apparatus having at least a first entrance and exit portion, a guiding portion and a second entrance and exit portion;

said cable routing and affixment apparatus additionally having a cross-sectional tubular-like shape useful for guiding said cable-like elements as they are pulled through said cable routing and affixment apparatus during installation;

said cable routing and affixment apparatus having at least one cable-like elements insertion and removal slot useful for inserting said cable-like elements during installation and removing said cable-like elements after installation wherein said cable-like elements insertion and removal slot has a width greater than zero;

said cable-like elements insertion and removal slot beneficially penetrating through at least one location of an outer surface of said cable routing and affixment apparatus to an adjacent inner surface of said cable routing and affixment apparatus said first entrance and exit portion and said second entrance and exit portion have an annular groove in combination with a cable-like elements retention device;

said cable-like elements retention device chosen from the group consisting of a cable-tie, a hook and loop strap, a hook and loop strap permanently affixed to said cable routing and affixment apparatus, and a hinged flap;

said hinged flap having a slot filling portion wherein said hinged flap is affixably attached to said cable routing and affixment apparatus; and at least one means for affixation.

2. In the cable routing and affixment apparatus of claim 1 wherein said inner surface of said cable routing and affixment apparatus is chosen from the group of having a friction reducing coating, a friction reducing inlay, and being made from a material having a friction reducing quality.

3. In the cable routing and affixment apparatus of claim 2, the additional improvement wherein said first entrance and exit portion and said second entrance and exit portion have an entrance shape chosen from the group consisting of a straight shape or a flared shape; and said entrance shape making a smooth transition to said guiding portion.

4. In the cable routing and affixment apparatus of claim 3, the additional improvement wherein said guiding portion is chosen from the group consisting of straight path, an arcuate elbow-like path, and a combinational arcuate elbow-like and straight path;

said arcuate elbow-like path having a bend angle between a first end and a second end of said arcuate elbow-like path having a range of arc of zero degrees up to and including 180 degrees.

5. In the cable routing and affixment apparatus of claim 4, the additional improvement wherein said cable-like elements insertion and removal slot has a width sufficient for insertion and removal of said cable-like element and a path shape wherein said path direction is beneficially directed by the axis of said cable routing and affixment apparatus and the outer surface of said cable routing and affixment apparatus of the cross-sectional tubular-like shape; and said path shape is chosen from the group consisting of straight and parallel to said axis of said cable routing and affixment apparatus, serpentine shape slot and parallel to said axis of said cable routing and affixment apparatus wherein said serpentine shape has an amplitude and pitch and said pitch is chosen from the group consisting of constant and varied, helical shape slot and parallel to said axis of said cable routing and affixment apparatus wherein said helical shape has a pitch and said pitch is chosen from the group consisting of constant and varied, and straight and askew to said axis of said cable routing and affixment apparatus.

6. In the cable routing and affixment apparatus of claim 5, the additional improvement wherein said cable routing and affixment apparatus additionally has a means for affixation to a structure; and said means for affixation is chosen from the group consisting of a corner bracket, legs with affixation holes, tabs for affixation, and beam clamps said corner bracket additionally having affixation holes for fastener use and additional holes and slots for use by a cable-like elements retention device and for fastener access.

7. In the cable routing and affixment apparatus of claim 5, the additional improvement wherein said cable-like elements insertion and removal slot of said cable routing and affixment apparatus is beneficially disposed at an outer radius of said arcuate-like elbow with a start point at the first entrance and exit portion and a finish point at the second entrance and exit portion.

8. In the cable routing and affixment apparatus of claim 3, the additional improvement wherein said guiding portion consists of a straight path with said cable-like elements insertion and removal slot path direction beneficially directed by the axis of said cable routing and affixment apparatus and said path shape is chosen from the group consisting of straight and parallel to said axis of said cable routing and affixment apparatus, and straight and askew to said axis of said cable routing and affixment apparatus.

9. In the cable routing and affixment apparatus of claim 8, the additional improvement wherein said cable routing and affixment apparatus additionally has an affixation to a structure means and multiple holes penetrating through said guiding portion for retaining said cable-like elements to said cable routing and affixment apparatus through the use of said cable-tie; and said cable routing and affixment apparatus additionally having a means for affixation as a hingeable portion for affixation to a mating feature of a second cable routing and affixment apparatus.

10. In the cable routing and affixment apparatus of claim 9, the additional improvement wherein said hingeable portion has mating surfaces of a clevis-like structure and additionally has a serrated surfaces for facilitating relative fixation through the tightening of a bolt and nut at a pivot.

11. In the cable routing and affixment apparatus of claim 10, the additional improvement wherein said affixation to a structure means further having a means for affixation to a corner bracket with affixation holes for fastener use and additional holes and slots for use by a cable-like elements retention device; and said corner bracket receptive for mounting a multiplicity of cable routing and affixment apparatus wherein the alignment of said multiplicity of cable routing and affixment apparatus shall simulate the path of a continuous cable routing and affixment apparatus.

* * * * *